United States Patent Office 3,640,967
Patented Feb. 8, 1972

3,640,967
PROCESS FOR THE PREPARATION OF POLYURETHANES
Klaus König and Erwin Müller, Leverkusen, Wilhelm Kallert, Cologne-Stammheim, and Cornelius Mühlhausen, Leverkusen, Germany, assignors to Farbenfabriken Bayer Aktiengesellschaft, Leverkusen, Germany
No Drawing. Filed Apr. 21, 1969, Ser. No. 818,104
Claims priority, application Germany, Apr. 23, 1968, P 17 70 245.3
Int. Cl. C08g 22/10
U.S. Cl. 260—77.5     6 Claims

ABSTRACT OF THE DISCLOSURE

A process for the preparation of polyurethanes, which may or may not be cross-linked, from higher molecular weight, linear dihydroxy compounds, diisocyanates and low molecular weight chain lengthening agents which contain at least two hydrogen atoms that are reactive with isocyanates, characterized in that the higher molecular weight dihydroxy compounds used are reaction products of ε-caprolactone and/or ε-hydroxycaproic acid, hexane-1,6-diol and diaryl carbonates.

---

The preparation of elastic polyurethanes which may or may not be cross-linked, from higher molecular weight linear dihydroxyl compounds, diisocyanates and low molecular weight chain lengthening agents containing at least two hydrogen atoms reactive with NCO groups is known.

A particular higher molecular weight linear dihydroxy compound which may be used in the described reaction is hexamethylene polycarbonate which can be prepared from hexane-1,6-diol and less than an equivalent quantity of diphenyl carbonate. This compound is unusual because it yields elastomers which have a particularly good resistance to hydrolysis upon reaction with diisocyanates and chain lengthening agents. Unfortunately, however, the freezing point of such elastomers is rather high, being about −15° C.

Higher molecular weight linear dihydroxy compounds obtained by polymerizing ε-caprolactone in the presence of glycols as initiators have also been used to prepare elastomers via reaction with diisocyanates and chain lengthening agents. However, the elastomers thus produced have relatively poor resistance to hydrolysis although they possess good flexibility in the cold.

If mixtures of the two above described high molecular weight dihydroxy compounds are used, urethane elastomers can be prepared which have a degree of resistance to hydrolysis and cold that is merely additive. As a consequence, when high proportions of hexamethylene polycarbonate are used, the elastomers obtained have relatively high freezing points and good resistance to hydrolysis whereas, when high proportions of the polycaprolactone are used, the elastomers obtained have a correspondingly inferior resistance to hydrolysis and lower freezing points.

It is therefore an object of this invention to provide an elastomeric polyurethane and a method for preparing the same which is devoid of the foregoing disadvantages.

It is a further object of this invention to provide elastomeric polyurethanes having particularly good resistance to hydrolysis and a method for making them.

Another object of this invention is to provide elastomeric polyurethanes which have low freezing points and good flexibility in the cold and a method for making them.

Still another object of this invention is to provide an elastomeric polyurethane wherein the property of good hydrolysis resistance is coupled with good flexibility properties in the cold as well as a low freezing point and a method for making the same.

The foregoing objects and others are accomplished in accordance with this invention, generally speaking, by providing a polyurethane and a process for preparing it wherein a polyisocyanate is reacted with a low molecular weight chain lengthening agent containing at least two hydrogen atoms reactive with NCO groups as determined by the Zerewitinoff method, and the reaction product of ε-caprolactone and/or ε-hydroxycaproic acid, hexane-1,6-diol and a diaryl carbonate.

It has been found that polyurethanes which have been prepared from the reaction products of ε-caprolactone and/or ε-hydroxycaproic acid, hexane-1,6-diol and a diarylcarbonate, diisocyanates and chain lengthening agents possess excellent resistance both to hydrolysis and to the cold. The mechanical properties of such elastomers are also excellent and the overall properties of the elastomers are far superior to those of polyurethanes obtained from comparable mixtures of polycaprolactone and hexamethylene polycarbonate.

The preparation of the polyester carbonates which can be used as higher molecular weight dihydroxy compounds in the process of this invention may be carried out by processes which are known per se (Houben-Weyl XIV/2, p. 48). For example hexane-1,6-diol may first be reacted with ε-caprolactone and/or ε-hydroxycaproic acid to open the ring or eliminate water and yield mixtures of the corresponding ester glycols. These mixtures are then converted into polyester polycarbonates by heating them with diaryl carbonates, generally without the use of a catalyst. The calculated quantity of the corresponding hydroxyaryl compound is distilled off during this reaction. Usually $$\frac{n}{2}-1$$

mols of diaryl carbonate are used for $n$ mols of OH, the number $n$ depending upon the required molecular weight. This molar ratio of hexane-1,6-diol to ε-caprolactone or ε-hydroxycaproic acid may, for example, be varied within the limits of 1:2 to 10:1.

Depending on the molar ratio which is used, liquid, oily or waxy products which usually have a molecular weight of between about 1000 and about 3000 are obtained. Thus, when using a molar ratio of hexanediol to caprolactone of 1:1, a liquid polyester carbonate is obtained; whereas, for example, a waxy product having a melting point of approximately 41° C. is obtained when a molar ratio of 4:1 is used.

Diphenylcarbonate is a particularly suitable diarylcarbonate because the phenol which is liberated can easily be distilled off from the reaction mixture. Examples of other diaryl carbonates which may be used are dinaphthylcarbonate and dicresylcarbonate, bis-chlorophenyl-carbonate, bis-methoxyphenyl-carbonate, dixylylcarbonate.

Diisocyanates which are suitable for use in the process according to the invention are aliphatic, cycloaliphatic, araliphatic and aromatic diisocyanates such as, for example, 1,4-tetramethylene diisocyanate, 1-methylcyclohexane-2,4- and 2,6-diisocyanates and mixtures thereof, xylylene diisocyanate, diphenylether-4,4'-diisocyanate, diphenylcarbonate-4,4'-diisocyanate, diphenyl sulphone-4,4'-diisocyanate and particularly 1,5-naphthylene diisocyanate, 4,4'-diphenylmethane diisocyanate, m- and p-phenylene diisocyanates, 2,4- and 2,6-tolylene diisocyanates and any isomeric mixtures of tolylene diisocyanate as well as any of those diisocyanates in Canadian Pat. No. 698,636. Dimeric diisocyanates as e.g. dimeric tolylene diisocyanate may also be used.

Suitable chain lengthening agents for use in the reaction when conducted without solvents usually have a molecular weight below about 500 and are generally glycols such as butane-1,4-diol, hexane-1,6-diol, butane-2,3-diol, p-phenylene-di-b-hydroxyethylether, p-xylylene glycol and naphthalene-di-b-hydroxylethylether. Unsaturated glycols such as, for example, glycerol monoallylether, dimethylol dihydropyran, 1,4-butane-bis-N,N'-allyl-N,N'-b-hydroxyethylurethane and the like may also be used when it is intended to cross-link the product with sulphur. If it is intended to crosslink the product with formaldehyde, m-dihydroxyethyl tolylene, for example, may be used. Other chain lengthening agents which may be used are 3,3'-dichloro-4,4'-diaminodiphenyl methane, diethyl-tolylene diamine and the like.

When the process is carried out in highly polar solvents it is preferred that the chain lengthening agents are NH functional and such compounds may be used in admixture if desired. Examples of some such suitable compounds include aliphatic or araliphatic diamines such as ethylene diamine, propylene-1,3-diamine, tetramethylene-1,4-diamine, hexamethylene-1,6-diamine, 1,3- and 1,4-hexahydrophenylene diamines, m-xylylene diamine or cis- and/or trans-hexahydro-m-xylylene diamines, hydrazine, N,N'-diaminopiperazine, dihydrazides such as carbodihydrazide, oxalic acid dihydrazides, malonic acid dihydrazide or glutaric acid dihydrazide. Water may also be used as a bifunctional chain lengthening agent.

The product of this invention is prepared by reacting the polyester carbonate of this invention with excess of diisocyanate. The resulting NCO terminated liquid prepolymer is poured into molds after the addition of a chain lengthening agent. The products can be removed from the mold after a short time when they have hardened. Elastomers having excellent properties, as already indicated, and a high resistance to hydrolysis are obtained by subsequently heating for about 24 hours at about 100° C.

In another method, the mixture of higher molecular weight polyhydroxyl compounds and chain lengthening agent, for example, a glycol, are reacted with approximately equivalent quantities or else an excess of diisocyanate. The reaction product is then granulated and can be hot molded. Since the hardness increases with increasing quantities of diisocyanate and glycol and, conversely, decreases with decreasing quantities of diisocyanate and glycol, polyurethane resins having different degrees of hardness and elasticity can be obtained by varying the proportions of the reactants employed. Cross-linked resins which can be worked up like thermoplastic resins can be produced in this way.

It is also possible to prepare synthetic resin products which are only cross-linnked in a second stage. In such a case the higher molecular weight dihydroxy compound of this invention is reacted in admixture with a chain lengthening agent with a quantity of diisocyanate less than that necessary to react with all of the end groups present in the higher molecular weight polyhydroxy compound and the chain lengthening agent. The resulting products can be stored and rolled and cross-linked at a later stage with a diisocyanate such as, for example, dimeric tolylene diisocyanate. These storage stable rollable products can also be cross-linked using peroxides if suitable diisocyanates such as, for example, 4,4'-diphenylmethanediisocyanate are used, and they can be cross-linked with sulphur or formaldehyde if suitably unsaturated chain lengthening agents are used.

Substantially linear segmented polyurethanes are obtained by reacting NCO prepolymers with approximately equivalent quantities of NH functional chain lengthening agents. For example diamines, hydrazine or dihydrazides can be used as chain lengthening agents in highly polar solvents such as, for example, in solvents which contain amide or sulphoxide groups including dimethylformamide, dimethylacetamide, dimethylsulphoxide and the like. Highly elastic filaments, coatings and microporous sheet structures can be prepared from the resulting polyurethane solutions. In such a case the solvent is removed by evaporation or coagulation, and the polyurethanes may, if desired, be cross-linked by the addition of cross-linking agents such as polymethylol compounds.

The products of this invention can be used, for example, as sealing materials in the construction of machinery, as drive chains or gear wheels, in the construction of vehicles, in the textile industry for the production of fabrics, as shoe soling and coating materials and so on.

The invention is further illustrated but is not intended to be limited by the following examples in which all parts and percentages are by weight unless otherwise specified.

EXAMPLE 1

About 2,280 parts (1 mol) of a polyester polycarbonate (OH number 49) is obtained by reacting hexane-1,6-diol and ε-caprolactone in the molar ratio of 4:1 and converting the reaction mixture into the polycarbonate using diphenyl carbonate. The polyester-polycarbonate thus obtained is then stirred together with about 357 parts (1.7 mol) of 1,5-naphthylene diisocyanate at about 126° C. About 40.5 parts (0.45 mol) of butane-1,4-diol are introduced into the melt after about 10 minutes under vacuum and the resulting mixture is poured into wax-lined molds. After about 24 hours at about 105° C., a molded product is obtained which has the properties listed in the table under 1.

EXAMPLE 2

In a manner similar to that of Example 1, about 1,860 parts (1 mol) of a polyester polycarbonate (OH number 60) obtained from hexane-1,6-diol and ε-caprolactone using a molar ratio of 1:1, are reacted with about 1.7 mols of 1,5-naphthylene diisocyanate and about 0.45 mols of butane-1,4-diol. The properties of the resulting molded product are listed under 2 in the table.

EXAMPLE 3

In a manner similar to that of Example 1, about 1,820 parts (1 mol) of a polyester polycarbonate (OH number 61) prepared from hexane-1,6-diol and ε-caprolactone using a molar ratio of 1:2, are reacted with about 1.7 mols of 1,5-naphthylene-diisocyanate and about 0.45 mols of butane-1,4-diol. The molded product has the properties listed under 3 in the table.

COMPARISON EXAMPLE I

In a manner similar to that of Example 1, about 2,000 parts (1 mol) of a poly-ε-caprolactone having an OH number of 56 are used. The properties of the molded product obtained are listed under I in the table.

COMPARISON EXAMPLE II

About 2,000 parts (1 mol) of a hexamethylene polycarbonate having an OH number of 56 is used in a reaction similar to that of Example 1. A molded product is obtained which has the properties listed under II in the table.

COMPARISON EXAMPLE III

If a mixture of about 1,600 parts of hexamethylene polycarbonate from comparison Example II and about 400 parts of polycaprolactone from comparison Example I is used in a reaction analogous to that described in Example 1, a molded product having the properties listed under III in the table is obtained.

COMPARISON EXAMPLE IV

Using a mixture of about 1,000 parts of polycaprolactone of comparison Example I and about 1,000 parts of the hexamethylene polycarbonate of comparison Example II in a reaction similar to that described in Example 1, a molded product having the properties listed under IV in the table is obtained.

COMPARISON EXAMPLE V

A mixture of about 1,300 parts of the polycaprolactone of comparison Example I and about 700 parts of the hexamethylene polycarbonate of comparison Example II under the conditions described in Example 1, yields a molded product having the properties listed under V in the table.

| Examples and comparison Examples | Shore hardness A | Tensile strength, kg./cm.² | Elongation at break, percent | Recoil elasticity | Dimensional stability | Damping maximum, °C. | Ageing by storage in water at 100° C., tensile strength after days, kg./cm.² | | | |
|---|---|---|---|---|---|---|---|---|---|---|
| | | | | | | | 2 | 4 | 4 | 8 |
| 1 | 89 | 252 | 430 | 58 | 27 | ª—29 | 235 | 224 | 216 | 199 |
| 2 | 90 | 240 | 447 | 58 | 28 | ª—33 | 225 | 216 | 210 | 204 |
| 3 | 89 | 252 | 530 | 55 | 37 | ª—38 | 245 | 232 | 224 | 206 |
| I | 88 | 264 | 630 | 62 | 32 | ª—37 (—23) | 122 | 80 | 60 | (b) |
| II | 90 | 282 | 423 | 48 | 40 | ª—15 (—14) | 252 | 242 | 253 | 248 |
| III | 88 | 269 | 483 | 55 | 41 | ª—24 (—22) | 260 | 180 | 160 | 145 |
| IV | 90 | 216 | 463 | 59 | 29 | ª—29 (—22) | 210 | 164 | 144 | 112 |
| V | 88 | 258 | 555 | 60 | 28 | ª—33 (—22) | 180 | 145 | 96 | 65 |

ª Remark: After tempering the material at —30° C. for 4 hours Examples 1–3 show no increase in the damping maximum after this treatment.
ᵇ Destroyed.

It is to be understood that any of the components and conditions mentioned as suitable herein can be substituted for its counterpart in the foregoing examples and that although the invention has been described in considerable detail in the foregoing, such detail is solely for the purpose of illustration.

What is claimed is:

1. A polyurethane prepared by reacting (1) a low molecular weight compound containing at least two hydrogen atoms reactive with NCO groups and (2) the reaction product of hexane-1,6-diol with ε-caprolactone or ε-hydroxycaproic acid in a molar ratio of from about 1:2 to about 10:1 and a diaryl carbonate, having a molecular weight of between about 1,000 and about 3,000 with (3) an organic diisocyanate.

2. The polyurethane of claim 1 wherein the diaryl carbonate is diphenyl carbonate, dinaphthyl carbonate, dicresyl carbonate, bis-chlorophenyl carbonate, bis-methoxyphenyl carbonate or dixylyl carbonate.

3. The polyurethane of claim 1 wherein hexane-1,6-diol is reacted with ε-caprolactone in a molar ratio of 1:1.

4. The polyurethane of claim 1 wherein hexane-1,6-diol is reacted with ε-caprolactone in a molar ratio of 4:1.

5. The polyurethane of claim 1 wherein hexane-1,6-diol is reacted with ε-caprolactone in a molar ratio of 1:2.

6. The polyurethane of claim 1 wherein the diisocyanate is 1,5-naphthylene-diisocyanate and the low molecular weight compound is butane-1,4-diol.

References Cited

UNITED STATES PATENTS 2,933,477  4/1960  Hostettler et al. ____ 260—77.5

FOREIGN PATENTS 1,410,520  8/1965  France.
1,479,785  3/1967  France.

DONALD E. CZAJA, Primary Examiner

D. J. BARRACK, Assistant Examiner

U.S. Cl. X.R.

260—77.5 AM, 77.5 D